United States Patent
Englert

(10) Patent No.: US 10,340,504 B2
(45) Date of Patent: **\*Jul. 2, 2019**

(54) METAL AIR BATTERY

(71) Applicant: Mahle International GmbH, Stuttgart (DE)

(72) Inventor: Peter Englert, Bad Friedrichshall (DE)

(73) Assignee: Mahle International GmbH (DE)

( * ) Notice: Subject to any disclaimer, the term of this patent is extended or adjusted under 35 U.S.C. 154(b) by 292 days.

This patent is subject to a terminal disclaimer.

(21) Appl. No.: 15/307,364

(22) PCT Filed: Apr. 9, 2015

(86) PCT No.: PCT/EP2015/057744
§ 371 (c)(1),
(2) Date: Jan. 17, 2017

(87) PCT Pub. No.: WO2015/165708
PCT Pub. Date: Nov. 5, 2015

(65) Prior Publication Data
US 2017/0170451 A1    Jun. 15, 2017

(30) Foreign Application Priority Data
Apr. 29, 2014   (DE) .................. 10 2014 208 044

(51) Int. Cl.
| | |
|---|---|
| *H01M 2/30* | (2006.01) |
| *H01M 2/40* | (2006.01) |
| *H01M 4/66* | (2006.01) |
| *H01M 6/50* | (2006.01) |
| *H01M 2/08* | (2006.01) |
| *H01M 4/46* | (2006.01) |
| *H01M 10/42* | (2006.01) |
| *B60L 11/18* | (2006.01) |
| *H01M 12/08* | (2006.01) |
| *H01M 4/38* | (2006.01) |
| *H01M 16/00* | (2006.01) |
| *H01M 4/02* | (2006.01) |

(52) U.S. Cl.
CPC .............. *H01M 2/40* (2013.01); *B60L 11/18* (2013.01); *B60L 11/1851* (2013.01); *H01M 2/08* (2013.01); *H01M 2/30* (2013.01); *H01M 4/463* (2013.01); *H01M 4/661* (2013.01); *H01M 6/5022* (2013.01); *H01M 6/5038* (2013.01); *H01M 10/425* (2013.01); *H01M 12/08* (2013.01); *H01M 4/381* (2013.01); *H01M 6/5077* (2013.01); *H01M 16/006* (2013.01); *H01M 2004/025* (2013.01); *H01M 2220/20* (2013.01); *H01M 2300/0002* (2013.01); *H01M 2300/0014* (2013.01); *Y02E 60/128* (2013.01)

(58) Field of Classification Search
CPC ............ H01M 2/08; H01M 2/30; H01M 2/40; H01M 4/381; H01M 4/463; H01M 4/661; H01M 6/5022; H01M 6/5077; H01M 10/425; H01M 12/08; H01M 16/006; H01M 2220/20; H01M 2300/0002; H01M 2300/0014; B60L 11/18; B60L 11/1851
See application file for complete search history.

(56) References Cited

U.S. PATENT DOCUMENTS

| | | | |
|---|---|---|---|
| 3,415,685 A | 12/1968 | Hansen | |
| 3,505,113 A | 4/1970 | Merten | |
| 3,847,671 A | 11/1974 | Leparulo et al. | |
| 4,521,497 A | 6/1985 | Tamminen | |
| 4,822,698 A | 4/1989 | Jackovitz et al. | |
| 4,842,963 A | 6/1989 | Ross, Jr. | |
| 5,415,949 A * | 5/1995 | Stone | H01M 2/18 |
| | | | 429/406 |
| 6,127,061 A | 10/2000 | Shun et al. | |
| 6,573,008 B1 | 6/2003 | Hasvold | |
| 10,008,754 B2 * | 6/2018 | Englert | H01M 2/08 |
| 2001/0023036 A1 * | 9/2001 | Faris | B60L 11/1883 |
| | | | 429/404 |

(Continued)

FOREIGN PATENT DOCUMENTS

| | | |
|---|---|---|
| DE | 2417571 A1 | 11/1974 |
| DE | 69830917 T2 | 5/2006 |

(Continued)

OTHER PUBLICATIONS

Machine translation of JP 63-078454 published on Apr. 8, 1988 (Year: 1988).*

(Continued)

*Primary Examiner* — Anca Eoff
(74) *Attorney, Agent, or Firm* — Fishman Stewart PLLC

(57) ABSTRACT

A metal-air battery may include a housing, at least one hollow-cylindrical cathode arranged in the housing between an air chamber and an electrolyte chamber, and at least one metallic anode arranged in the electrolyte chamber. The battery may also include an air path leading through the housing from an air inlet to an air outlet of the housing, both of which may be fluidically connected to the air chamber, and an air supply device for generating an air flow following the air path and impinging on the cathode. The battery may further include an electrolyte path leading through the housing from an electrolyte inlet to an electrolyte outlet of the housing, both of which may be fluidically connected to the electrolyte chamber, and an electrolyte supply device for generating an electrolyte flow following the electrolyte path and impinging on the anode and the cathode.

33 Claims, 2 Drawing Sheets

(56) References Cited

U.S. PATENT DOCUMENTS

| | | |
|---|---|---|
| 2004/0137291 A1 | 7/2004 | Smedley et al. |
| 2004/0224195 A1 | 11/2004 | Huang |
| 2006/0099472 A1 | 5/2006 | Hsu |
| 2009/0130504 A1 | 5/2009 | Van Burdine |
| 2011/0003221 A1 | 1/2011 | Mizuno |
| 2012/0098497 A1 | 4/2012 | Ogane et al. |
| 2013/0078535 A1 | 3/2013 | Aizawa |
| 2013/0309581 A1* | 11/2013 | Yamaguchi ........... H01M 12/06 429/403 |
| 2014/0004394 A1 | 1/2014 | Kerkamm |
| 2014/0011058 A1 | 1/2014 | Adachi et al. |
| 2014/0065499 A1 | 3/2014 | McElroy et al. |

FOREIGN PATENT DOCUMENTS

| | | |
|---|---|---|
| DE | 112009000223 T5 | 12/2010 |
| DE | 102010033020 A1 | 2/2012 |
| DE | 102011002549 A1 | 7/2012 |
| DE | 102011002729 A1 | 7/2012 |
| DE | 112010002707 T5 | 10/2012 |
| DE | 102013107033 A1 | 1/2014 |
| GB | 1317214 A | 5/1973 |
| JP | 63-078454 * | 4/1988 |
| JP | 2011-253789 A | 12/2011 |
| WO | WO-2004/038828 A2 | 5/2004 |
| WO | WO-2012/156972 A1 | 11/2012 |
| WO | WO-2013/128445 A1 | 9/2013 |
| WO | WO-2013/150519 A1 | 10/2013 |
| WO | WO-2013/150520 A1 | 10/2013 |
| WO | WO-2013/150521 A1 | 10/2013 |
| WO | WO-2013/165406 A1 | 11/2013 |
| WO | WO-2014/009951 A1 | 1/2014 |

OTHER PUBLICATIONS

English abstract for JP-2011-253789.
English abstract for DE-102011002729.
English abstract for DE-102010033020.

* cited by examiner

METAL AIR BATTERY

CROSS-REFERENCE TO RELATED APPLICATION

This application claims priority to German Patent Application No. DE 10 2014 208 044.4, filed on Apr. 9, 2014, and International Patent Application No. PCT/EP2015/057744, filed on Apr. 9, 2015, both of which are hereby incorporated by reference in their entireties.

TECHNICAL FIELD

The present invention relates to a metal-air battery, in particular to an aluminium air battery. The invention, furthermore, relates to a battery system comprising at least two such batteries. In addition, the invention relates to an electromotorically equipped vehicle that is equipped with at least one such battery or with one such battery system. Finally, the invention relates to a method for operating such a battery.

Metal-air batteries are generally primary cells, i.e. is galvanic cells that cannot be electrically recharged, which generate a certain electrical voltage through a chemical reaction of the respective metal with air oxygen. Such a primary cell can also be called fuel cell. In contrast with primary cells, secondary cells, so-called accumulators, are electrically rechargeable.

An exemplary construction for a zinc-air battery is known from WO 2012/156972 A1.

From WO 2013/150519 A1 a zinc electrode for reuse in a rechargeable battery is known.

From WO 2013/128445 A1 a metal-air battery is known, in which the consumed fuel, namely zinc, is discharged with the help of a liquefying agent.

From WO 2013/150520 A1 it is known, for a metal-air battery, to flush out an electrolyte with a washing solution in order to transfer the battery into a standby mode.

From WO 2013/150521 A1 it is known, for a metal-air battery, to renew an electrolyte dependent on requirement.

From WO 2014/009951 A1 it is known to couple a metal-air battery with a rechargeable electrical energy storage unit, i.e. with an accumulator, in such a manner that varying power demands are achieved through a corresponding distribution of the power requirement over the metal-air battery and the respective accumulator. Because of this, the metal-air battery is buffered with the accumulator and the metal-air battery can be operated relatively constantly since power fluctuations can be offset by the accumulator.

Controls for rechargeable batteries are known from DE 11 2010 002 707 T5, from DE 11 2009 000 223 T5, from DE 10 2011 002 549 A1, from DE 10 2013 107 033 A1 and from DE 24 17 571 A1.

Metal-air batteries can be highly interesting for use in electric vehicles since they possess a very high chemical energy density. With the help of such metal-air batteries, a range of an electric vehicle, compared with accumulators, can thus be significantly increased.

Problematic in the case of metal-air batteries is the realisation of a power control, which makes possible a dynamic adaptation to suit a vehicle of the electric energy that can be supplied with the help of the metal-air battery to the electric energy that is currently required by the vehicle. In the case of vehicles with electric motor drive the required electric energy is subjected to major fluctuations, emanating from the usually non-stationary driving operation. If the metal-air battery is designed for a high output, the lifespan of the battery is reduced even in particular when only comparatively little output is required. Accordingly, an elaborate power control, e.g. in conjunction with an accumulator as power buffer is usually required.

SUMMARY

The present invention deals with the problem of stating an improved embodiment for a metal-air battery or for an associated operating method or for a vehicle equipped with such, which is characterized in particular by a high efficiency and a long lifespan for the battery. Furthermore, a simple adaptability of the battery to varying power requirements is desirable.

According to the invention, this problem is solved through the subjects of the independent claims. Advantageous embodiments are subject of the dependent claims.

With respect to the metal-air battery, the invention is based on the general idea of arranging a metallic anode in a hollow cylindrical cathode which in turn is arranged in a housing of the battery. Radially between anode and cathode an electrolyte space is located. Radially between cathode and housing an air space is located. Because of this, an extremely compact battery construction is obtained, as a result of which a high power density can be realised. Furthermore, this construction makes possible a particularly favourable flow routing for the electrolyte on the one hand and for the air on the other hand. Accordingly, an air path leading through the housing is provided, which leads from an air inlet of the housing, which is fluidically connected to the air chamber, to an air outlet of the housing, which is fluidically connected to the air chamber. With the help of an air supply device, an air flow which follows the air path and impinges on the cathode can thus be produced. Furthermore, an electrolyte path leading through the housing is provided, which leads from an electrolyte inlet of the housing, which is fluidically connected to the electrolyte chamber, to an electrolyte outlet of the housing, which is fluidically connected to the electrolyte chamber. With the help of an electrolyte supply device, an electrolyte flow following the electrolyte path and impinging on the anode and the cathode can now be produced. Through the coaxial arrangement of housing, air chamber, cathode, electrolyte chamber and anode, low flow resistances can be realised for the air path and for the electrolyte path so that in particular major volumetric flows for the air along the air path on the one hand and for the electrolyte along the electrolyte path on the other hand can be realised. Accordingly, adequate oxygen can be particularly easily replenished on the cathode. On the anode, sufficient unused electrolyte can be additionally replenished and consumed electrolyte discharged. A body being "impinged" by a fluid in the present context is to mean that the respective fluid contacts the impinged body regardless of whether the fluid is supplied by means of positive pressure or sucked in by means of negative pressure.

It is possible, in particular, furthermore, to configure the air supply device so that the volumetric flow of air along the air path is adjustable, i.e. variable in a relatively large range. Likewise, the electrolyte supply device can be easily configured so that the volumetric flow of the electrolyte is adjustable, i.e. variable in a relatively large range. In this way, electric power that can be tapped off on the metal-air battery can be particularly easily adjusted hydraulically by varying the electrolyte flow and/or pneumatically by varying the air flow.

The metal-air battery according to a preferred embodiment is configured as aluminium air battery so that the anode comprises an anode body exposed to the electrolyte which comprises an aluminium alloy or consists thereof.

According to an advantageous embodiment, a control device for operating the metal-air battery can be provided, which is electrically connected on the one hand to the air supply device and on the other hand to the electrolyte supply device. The control device can now be configured or programmed so that as a function of a current electric power demand on the metal-air battery it activates the air supply device for generating an air flow adapted to this power demand and/or activates the electrolyte supply device for generating an electrolyte flow that is adapted to this power demand. Varying the volumetric flow of electrolyte and/or the electric power that can be tapped off the metal-air battery can be varied. Since the volumetric flows of air and/or electrolyte can be varied comparatively easily and comparatively quickly in a relatively wide range, the electric power that can be tapped off the metal-air battery can be relatively quickly adapted to the currently demanded power through the procedure introduced here. In particular, the power that is provided on the metal-air battery and which can be tapped off can also be adapted in a short time to lower power demands by reducing the air flow and/or electrolyte flow as a result of which the life span of the metal-air battery can be significantly prolonged. The open-loop or closed-loop power control introduced here operates hydraulically or hydropneumatically.

In particular, the control device can realise a closed-loop power control, taking into account the current power demand as set point value and electric power measured on electrical or galvanic power connections of the metal-air battery as actual value. By way of a set point-actual comparison, the control device can track the volumetric flow for the electrolyte and/or for the air accordingly.

According to another advantageous further development, the control device can be configured or programmed so that it activates, as a function of the current power demand, the electrolyte supply device for generating the electrolyte flow adapted to this power demand and activates the air supply device for generating an air flow adapted to the adapted electrolyte flow. In other words, the control device initially determines in a first step the volumetric flow of electrolyte needed for the current power demand and activates the electrolyte supply device accordingly. In a second step, which can take place quasi simultaneously to the above-mentioned first step, the control device, dependent on the determined electrolyte volumetric flow, determines an air volumetric flow needed for this purpose and activates the air supply accordingly.

With another advantageous further development it can be provided that the control device is configured or programmed so that it activates the electrolyte supply device for draining the electrolyte path of electrolyte for switching off the metal-air battery. Through such draining of the electrolyte path, in particular of the electrolyte chamber, the chemical reaction between anode and electrolyte in the metal-air battery is completely interrupted, as a result of which the decomposition or dissolution of the anode is greatly reduced. The life span of the battery is prolonged accordingly.

With another advantageous embodiment, the anode can be rotatably rotated about its longitudinal centre axis on the housing. Through the rotatability of the anode relative to the housing, a rotation of the anode with respect to the stationary housing can be realised. Here, the anode also rotates relative to the cathode, which with respect to the housing is rotationally fixed. The rotating anode improves the flow circulation about the anode with electrolyte. At the same time, reaction products owing to centrifugal forces can better detach from the anode which enlarges the surface area of the anode that is available for the electrolysis.

Provided that the anode is rotatably arranged on the housing, a corresponding rotary drive, for example by an electric motor, can be provided in principle in order to rotate the anode. Alternatively it can be provided that the anode is configured so that a rotation of the anode drives the electrolyte in the electrolyte path. This imparts an additional function. Here, a further development is particularly advantageous in which the anode on its outside exposed to the electrolyte chamber comprises flow guiding structures which drive the electrolyte with rotating anode. Moving blades, which are arranged in particular helically, are conceivable.

According to another embodiment it can be provided that the anode is driven by the electrolyte flow, i.e. hydraulically. To this end, the electrolyte path is conducted past the anode so that the electrolyte flow rotatingly drives the anode. Accordingly, the kinetic energy of the electrolyte flow is utilised in order to rotate the anode. An additional energy-consuming electric drive can thus be omitted.

According to an advantageous further development, the electrolyte inlet can be arranged on a first end region of the electrolyte chamber tangentially to the electrolyte chamber, while the electrolyte outlet is arranged on a second end region of the electrolyte chamber, in particular axially. Through the spaced arrangement of electrolyte inlet and electrolyte outlet a quasi axial through-flow of the electrolyte chamber is realised for the electrolyte. Through the tangential arrangement of the electrolyte inlet a helical through-flow materialises in the electrolyte chamber which can also be called a swirling flow. Through surface friction, the swirling flow results in a rotary movement of the anode. The tangential arrangement in this case can be found in a cross section of the air chamber or of the cathode, which runs perpendicularly to the longitudinal centre axis of the cathode.

Additionally or alternatively, the anode can comprise flow guiding structures on its outside exposed to the electrolyte chamber, which transmit a torque to the anode when the anode is impinged by the electrolyte flow. Accordingly, kinetic energy of the electrolyte flow can be specifically utilised for driving the anode.

Through a corresponding volumetric flow of the electrolyte, the rotation of the anode can take place with a comparatively high rotational speed which can be selected in particular so high that adequate centrifugal forces are generated which make possible reaction products detaching from the anode. Rotational speeds up to 300 revolutions per minute are conceivable for example.

The housing is practically insulated or produced from an electrically insulated material, for example from plastic. The arrangement of the anode in the housing advantageously takes place so that the longitudinal centre axis of the anode and thus also a longitudinal centre axis of the cathode substantially extend vertically in the state of the battery as used.

According to another advantageous embodiment, the anode or an anode body can be configured cylindrically and be mechanically and electrically connected to a metallic support plate. Through this design, the anode can be more easily positioned in the housing, for example coaxially in the cathode.

According to an advantageous embodiment, the in particular circular support plate can be rotatably mounted on the housing about a longitudinal centre axis of the anode by way of an axial bearing. Accordingly, the anode is rotatably mounted on the housing in the region of its support plate. The support plate can be produced from a metal alloy other than that of the anode as a result of which the design of a suitable mounting in the region of the support plate is simplified. By way of the axial bearing, axial forces can be particularly easily braced between the anode and the housing. The axial bearing can for example be arranged on an axial face end of the housing, which in the operating state of the battery is arranged at the top.

With another further development, a galvanic power connection of the metal-air battery on the anode side, which represents an electrical negative terminal, can be formed on the axial bearing. The axial bearing comprises a region that is connected to the housing in a fixed manner, which can also be described as stationary area, and which is suitable, in a particular manner, for forming the power connection on the anode side. Because of this, said power connection on the anode side is stationary, although the anode itself is rotatable relative to the housing. Because of this, the drawing of power on the battery is simplified.

According to another further development, the axial bearing can be configured as sliding bearing and comprise a metallic sliding ring which lies in an annular bearing shell on the housing side and on which the support plate is supported and on which the support plate slides with rotating anode. By configuring the axial bearing as sliding bearing, a comparatively large contact area between support plate and axial bearing or anti-friction metal ring can be realised, which simplifies the power transmission between anode and axial bearing.

Particularly advantageous is an embodiment, in which the anti-friction metal alloy comprises an annular body made of an anti-friction metal alloy and at least one preferentially metallic heating conductor arranged in the annular body with which the annular body can be heated. By heating the annular body, the power transmission between anti-friction metal ring and support plate can be improved.

Particularly advantageous is a further development in which a power supply of the heating conductor is configured so that the heating conductor heats the annular body to a predetermined operating temperature which lies below a melting point of the anti-friction metal alloy and is so close to the melting point of the anti-friction metal alloy at the same time that surface melting occurs on the annular body. The anti-friction metal alloy in this case is a low-melting alloy the melting point of which can lie for example between 50° C. and 300° C. The predetermined operating temperature lies for example 10% to 15% below the melting temperature, in particular approximately 40° C. below the melting point. By way of the surface melting so induced a liquid metal film is created on the surface of the anti-friction metal ring, on which the support plate slides in the manner of a hydraulic bearing. On the one hand, this significantly reduces the friction between support plate and anti-friction metal ring. On the other hand, a significantly improved electrical contacting materialises through the liquid metal film. For example, a formation of an oxide layer of the surfaces which are in contact with one another can for example be reduced in the liquid metal film. Through the configuration introduced here, an extremely low-loss electrical contacting between support plate and axial bearing can thus be realised, as a result of which high currents can be realised with low voltages.

The control of the power supply of the heating conductor, with the help of which the desired operating temperature can be adjusted in the annular body, can for example be effected by way of temperature measurement. It is likewise conceivable to connect the respective heating conductor in series with a PTC element, PTC standing for positive temperature coefficient. The respective PTC element in this case is matched to the desired operating temperature. In this way, a self-regulating heating-up of the respective heating conductor is created without major electronic effort, via which the annular body can be specifically heated to the predetermined operating temperature.

The power supply of the respective heating conductor can be practically incorporated in a current path between the anode and the galvanic current connection on the anode side.

In another advantageous embodiment, the air supply device can comprise a concentration device upstream of the air inlet, which increases the oxygen proportion in the air flow. Thus, the air flow with respect to the oxygen it carries along is enriched which correspondingly improves electrolysis function on the cathode. Such a concentration device can be equipped for example with a suitable filter membrane or with a suitable molecular sieve, by way of which on the one side the nitrogen proportion increases and the oxygen proportion decreases, while on the other side the nitrogen proportion decreases and the oxygen proportion increases. For example, the natural oxygen content can be increased with the help of such a concentration device from approximately 20% in air to over 90%.

Provided that a filter medium is employed which has to be periodically regenerated, the concentration device comprises two or more concentration units so that an increase of the oxygen proportion by way of at least one concentration unit can be continuously carried out while another concentration unit is regenerated at the same time.

In another advantageous embodiment, the electrolyte supply device can comprise an electrolyte circuit which comprises an advance and a return. The advance in this case leads from an electrolyte tank to the electrolyte inlet, while the return leads from the electrolyte outlet to the electrolyte tank. By using such a closed electrolyte circuit, the electrolyte can be permanently used. In particular, even higher volumetric flows for the electrolyte thus become possible which are so great that the electrolyte while flowing through the electrolyte path does not become completely unusable.

According to an advantageous further development, an advance pump for driving the electrolyte can be arranged in the advance. By way of the advance pump, the current volumetric flow of electrolyte that is conducted through the electrolyte path can be adjusted for example.

In another embodiment, a return pump for driving the electrolyte can be arranged in the return. The return pump serves for delivering the electrolyte from the electrolyte outlet to the electrolyte tank. It can be used, in particular, also for draining the electrolyte chamber or the electrolyte path, for example with activatable ventilation and bleeding of the electrolyte circuit.

In another embodiment, an electrolyte cleaning device for removing reaction products from the electrolyte can be arranged in the return. Such an electrolyte cleaning device in this case is practically arranged downstream of the return pump and can for example be configured as centrifuge with membrane. With the help of the electrolyte cleaning device, conditioning of the electrolyte coming from the electrolyte chamber can be realised in such a manner that the conditioned electrolyte can be again fed to the electrolyte chamber. Because of this, the electrolyte consumption is minimised.

In another advantageous embodiment, a gas separation device for removing gases from the liquid electrolyte can be arranged in the return. During the electrolysis reaction in the metal-air battery, gases can be generated, in particular hydrogen. The gases have to be separated from the liquid electrolyte for example in order to improve the efficiency of the electrolysis function. In particular, formation of froth in the electrolyte is to be avoided as well. The gas separation device can operate for example with nozzles, as a result of which particularly large gas bubbles are formed in the electrolyte which can be separated relatively easily. According to an advantageous further development, the gas separation device can be fluidically connected by way of a gas line with a conversion device for converting the chemical energy of the separated gas into electric and/or thermal energy. Accordingly, the chemical energy of the gas accrued as waste product can be utilised in order to improve the entire energetic efficiency of the metal-air battery.

According to an advantageous further development, the conversion device can be a catalytic burner which for example comprises a platinum net. The gaseous hydrogen in this case is converted with air oxygen into water. The heat generated during this can be utilised for heating the battery. Alternatively to this, the conversion device can be formed by a hydrogen-air fuel cell, in which the hydrogen gas is converted with oxygen gas into electric current and heat. The heat can be used again for heating the battery. The electric energy can be likewise utilised within the metal-air battery or be utilised as additional electric power. A suitable hydrogen-air fuel cell in this case can be configured as low-temperature fuel cell or PEM fuel cell, wherein PEM stands for proton exchange membrane. In principle, embodiment as high-temperature fuel cell, in particular as SOFC fuel cell is also conceivable, SOFC standing for solid oxide fuel cell.

The heat transfer between the conversion device and the remaining metal-air battery can take place for example with the help of a heat exchanger, which is suitably incorporated in the electrolyte circuit. Excess heat can be also be extracted from the electrolyte with the help of this heat exchanger. The heat can then be specifically utilised in order to heat the anode and/or the cathode in order to improve the electrolysis reaction.

With another advantageous embodiment, the air inlet can be arranged tangentially to the air chamber. Additionally or alternatively, the air outlet can be arranged tangentially to the air chamber. The tangential arrangement of the air inlet or of the air outlet can be utilised in order to configure the air flow helically, i.e. as swirling flow within the air chamber, as a result of which a prolonged dwell duration for the air flow within the air chamber materialises. Because of this, the transfer of oxygen between air flow and cathode is improved.

According to another advantageous embodiment, an induction heating for heating the anode can be provided. Such an induction heating operates for example by means of at least one induction coil which generates a stationary, spatially inhomogeneous, electromagnetic field in the region of the anode. By moving or rotating the anode in this electromagnetic field, heat is induced in the anode in particular in a wall region facing the electrolyte chamber, which significantly improves the electrolysis reaction.

The respective induction heating in this case can be arranged in the region of the cathode, as a result of which a particularly compact design can be realised. With the help of the induction heating, the anode can be heated, namely specifically in the wall region facing the electrolyte chamber. Because of this, only comparatively little energy is needed in order to heat the actual reaction zone. The increased temperature in the reaction zone improves the energetic efficiency of the metal-air battery.

A battery system according to the invention comprises a plurality of metal-air batteries of the type described above and is characterized by a common air supply device for generating the respective air flow through the air paths of the batteries and/or through a common electrolyte supply device for generating the respective electrolyte flow through the electrolyte paths of the batteries and/or through a common control device for operating the batteries. Here, the batteries can be fluidically connected in series or parallel with their air paths and/or with their electrolyte paths. Through this design, realising an efficient battery system is simplified. In particular, a common air delivery device can be utilised for a plurality of batteries. In addition or alternatively, an electrolyte delivery device can be utilised for a plurality of batteries. Additionally or alternatively, the open-loop or closed-loop control of the battery system is also simplified since a common control device can be utilised for a plurality of batteries.

A vehicle according to the invention, which can preferably be a road vehicle, comprises an electromotoric drive and is equipped with at least one metal-air battery of the type described above or with a battery system of the type described above. The vehicle is characterized in particular by a power electronic system for the power supply of the electric drive, which is coupled to the respective metal-air battery or the battery system in the unbuffered state. An electrically unbuffered coupling corresponds to a direct electrical connection which is effected without intermediate connection of an electric energy storage unit, i.e. in particular without intermediate connection of an accumulator. The invention, with respect to the vehicle, is thus based on the general idea of utilising the respective metal-air battery directly for the power supply of the electric drive so that the intermediate connection of an additional electric energy storage unit such as for example an accumulator can be omitted.

With respect to the method, the invention is based on the general idea of hydraulically or pneumatically open-loop or closed-loop controlling the electric power output of the metal-air battery. In other words, the open-loop or closed-loop power control of the metal-air battery is effected via a specific variation of the volumetric flows of the electrolyte and/or of the air. Such a pneumatic or hydraulic closed-loop or open-loop power control can be realised particularly easily with conventional components such as for example blowers and/or pumps.

Accordingly, it can be provided, according to an advantageous embodiment, that for adapting the electrolyte flow at least one electrolyte delivery device, for example a suitable pump, is suitably activated for increasing or reducing its delivery output. Additionally or alternatively it can be provided that for adapting the air flow at least one air delivery device, for example a suitable blower, is suitably activated for increasing or for reducing its delivery output.

According to another aspect of the invention or corresponding to another advantageous embodiment, the anode can comprise an anode body which in a matrix of sodium, contains particles of an aluminium alloy. In conjunction with an electrolyte, which contains water, a violent reaction usually occurs when sodium comes into contact with water, which in this case however is phlegmatized through the aluminium particles. Nevertheless, a good solubility of the anode or of the anode body in the respective electrolyte materialises, which makes possible a high electric output.

Preferred is an embodiment, in which the particles have a particle size of 10 µm to 100 µm, preferentially of 40 µm to 60 µm. Particularly advantageous is an embodiment, in which the particles have a particle size of approximately 50 µm. Through the selected particle size a comparatively large surface area for the aluminium alloy is obtained, which favours the desired electrolysis reaction.

With another advantageous embodiment, a proportion of particles in the anode body can lie in a range from 40% to 80%, preferentially from 60% to 70%. Particular advantageous in this case is an embodiment, in which the proportion of particles in the anode body lies at approximately 65%. The above percentage information is based on percent by weight. The remaining proportion in the anode body is then formed by the sodium matrix. At 65% particle proportion, the matrix accordingly has a proportion of 35% in the anode body.

Of particular importance is an embodiment, in which the aluminium alloy contains zirconium. By adding zirconium as alloy to the aluminium, the formation of a passive layer on the surface of the anode exposed to the electrolyte just so far that a formation of hydrogen is not preferred while at the same time a loss through the passage overvoltage is significantly reduced. The electrolysis on the anode surface leads to a passivation of the anode surface which defines a passage overvoltage. The greater the passive layer, the higher the passage overvoltage that is required to penetrate the passive layer. By adding zirconium, the formation of the passive layer can thus be reduced which lowers the passage overvoltage. It is important that by adding zirconium as alloy the formation of the passive layer is not completely prevented. The absence of the passive layer with aluminium would result in that the aluminium would decompose even upon contact with water subject to forming hydrogen. Such an intense hydrogen formation in the electrolyte however is undesirable within the metal-air battery.

According to an advantageous further development, the aluminium alloy can contain 0.01% to 1.00% zirconium, preferred is a content of 0.05% to 0.80% of zirconium. Particularly advantageous is a content of approximately 0.5% of zirconium. In particular, the remainder of the aluminium alloy, aside from the usual unavoidable contaminations, is formed by aluminium. The percentage information here, too, is based on percent by weight.

For producing such an anode, a method is additionally proposed in which a granulate of an aluminium alloy is introduced into a melt and in which subsequently an anode or an anode body out of this sodium melt with aluminium granulate introduced therein is cast. In particular, rod-shaped cylindrical anode bodies can thereby be realised.

According to a further independent aspect of the invention or according to another advantageous embodiment, the electrolyte for the metal-air battery described above can be formed by an aqueous acid or aqueous alkaline solution, which contains at least one halogen and at least one tenside. Preferred is an aqueous alkaline solution. With the help of the respective halogen, the chemical reaction on the anode surface can be improved since by the addition of the halogen the acid or the alkaline solution can better penetrate the passive of the respective metal anode. By adding the respective tenside, the electrochemical reaction can be improved since the tenside improves the electron exchange on the anode surface with the electrolyte. Furthermore, the tenside brings about an improved dissolution of the gases forming during the reaction, which likewise improves the electrochemical reaction.

Advantageously, the respective acid or alkaline solution has a 10% to 40% proportion in the water. Preferably, it is 20% acid or alkaline solution±5%. The percentage information in this case again relates to percent by weight.

According to an advantageous embodiment, the halogen can amount to 0.1% to 4%, preferentially 0.5% to 2% in the acid or alkaline solution. The information also relates to percent by weight. Preferably, the halogen is a fluoride, in particular a potassium aluminium pentafluoride.

In another embodiment, the acid or alkaline solution can contain the tenside in a concentration of 0.1% to 2%, preferentially in a concentration of 0.2% to 1%. Preferably, the tenside is sodium lauryl sulphate.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

It shows, in each case schematically.

DETAILED DESCRIPTION

Figure 1:
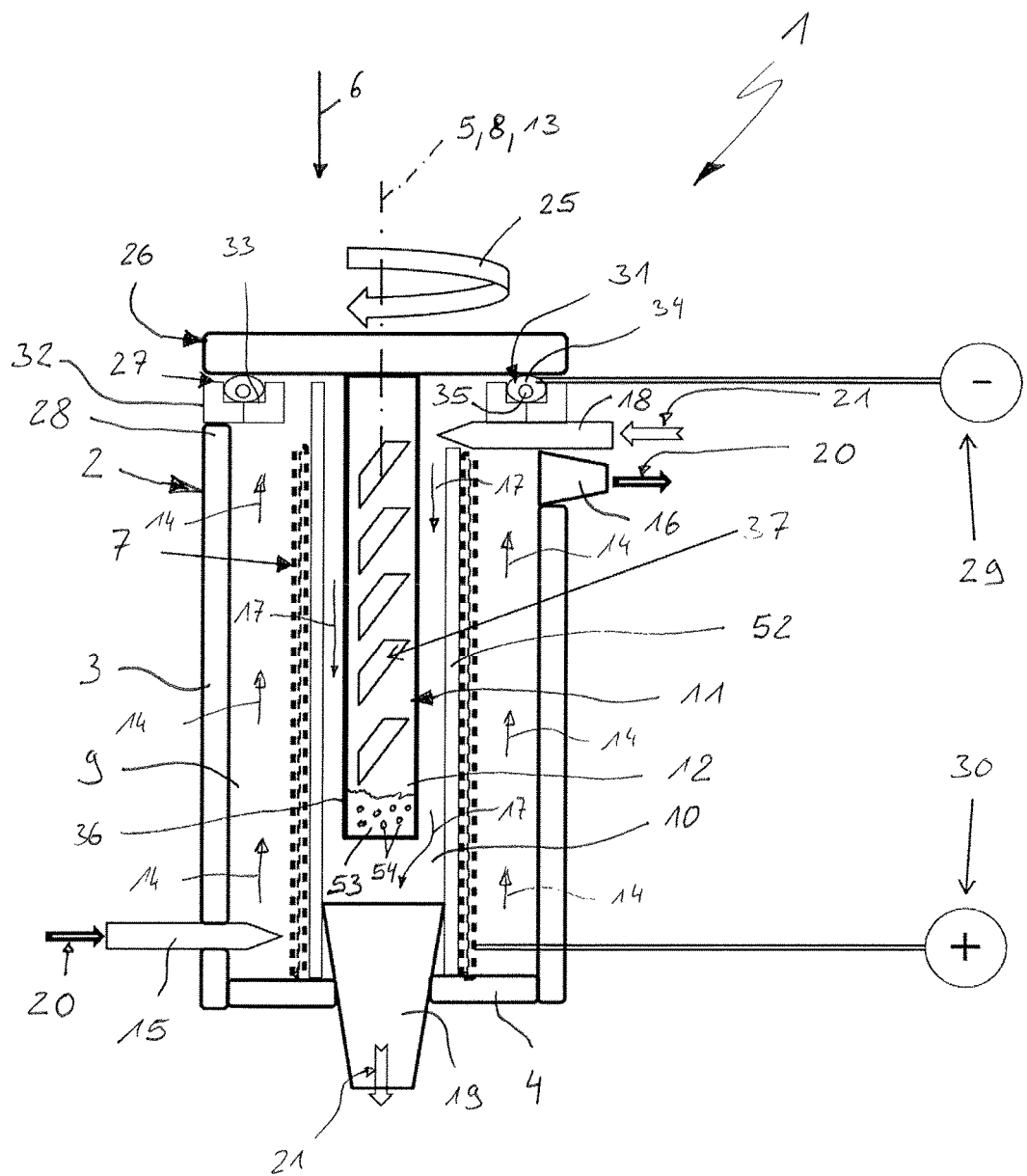
FIG. 1 a greatly simplified diagram representation in the manner of a circuit diagram of a metal-air battery without peripheral components, FIG. 2 a view as in FIG. 1, however with peripheral components.
Figure 2:
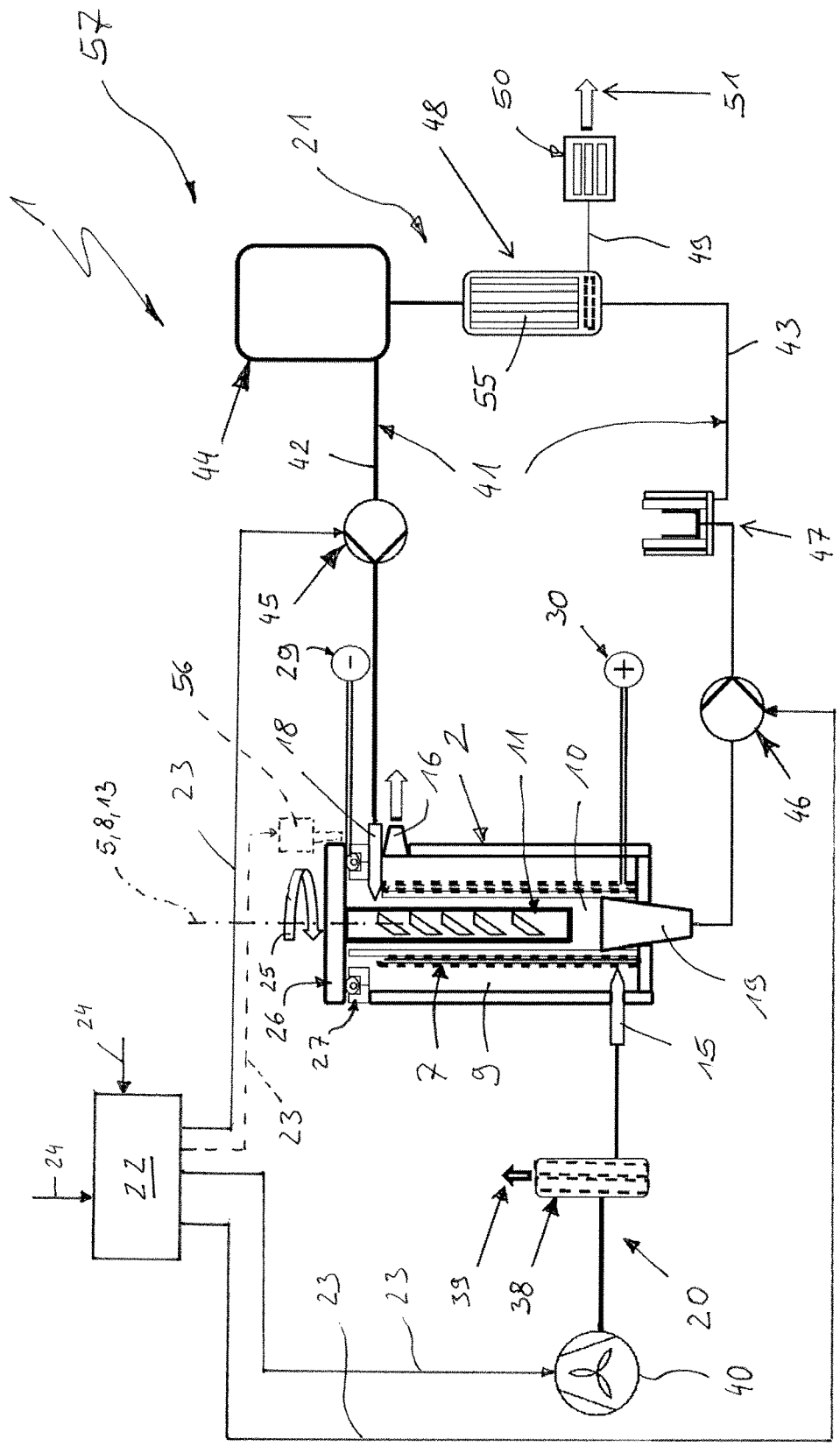

Corresponding to the FIGS. 1 and 2, a metal-air battery 1, which is preferably an aluminium air battery, comprises a housing 2, which is electrically insulated and preferably consists of an electrically insulating material, for example of plastic. The housing 2 in the shown example is configured as a cylindrical container and comprises a cylindrical shell 3 and a plate-shaped, in particular circular, bottom 4. In the installation state or operationally ready state of the metal-air battery 1, which in the following can also be described abbreviated as battery 1, the housing 2 is arranged so that a longitudinal centre axis 5 of the housing 2 is substantially orientated vertically, i.e. substantially parallel to the direction of gravity 6, which in FIG. 1 is indicated by an arrow. The battery 1 furthermore comprises at least one hollow-cylindrical cathode 7, which is arranged in the housing namely preferentially so that in the operationally ready state of the battery 1 a longitudinal centre axis 8 of the cathode 7 substantially runs parallel to the direction of gravity 6. In the shown example, the housing 2 and the cathode 7 are arranged coaxially and concentrically to one another so that the two longitudinal centre axes 5, 8 coincide. The cathode 7 separates in the housing 2 an air chamber 9 from an electrolyte chamber 10. The cathode 7 consists in the usual manner of a porous material, as a result of which a large surface area is made available to the generally liquid electrolyte, which makes possible contacting with the gaseous oxygen contained in the air. For example, the cathode can be formed of a permeable membrane or comprise such.

Furthermore, the battery 1 comprises at least one metallic anode 11, which is arranged in the electrolyte chamber 10. In the example, the anode 11 has a cylindrical anode body 12 with a longitudinal centre axis 13 and is arranged coaxially to the cathode 7 and in particular concentrically thereto. Accordingly, the longitudinal centre axes 5, 8, 13 coincide here.

An air path 14, which is indicated by arrows in FIG. 1 and which in the housing 2 fluidically connects an air inlet 15 of the housing 2 passing through the air chamber 9 to an air outlet 16 of the housing, leads through the housing 2. In addition, an electrolyte path 17 leads through the housing 2, which is indicator arrows in FIG. 1 and which fluidically connects an electrolyte inlet 18 of the housing 2 passing through the electrolyte chamber 10 to an electrolyte outlet 19 of the housing 2.

In addition, the battery 1 is equipped with an air supply device 20, with the help of which for the operation of the battery 1 an air flow can be generated, which during the operation of battery 1 follows the air path 14 and thereby impinges, i.e. flows onto or circulates around the cathode 7. In addition, an electrolyte supply device 21 is provided, with the help of which during the operation of the battery 1 an electrolyte flow can be generated, which during the operation of the battery 1 follows the electrolyte path 17 and thereby impinges, i.e. flows onto or circulates about the anode 11 and on the other hand the cathode 7.

For operating the battery 1, a control device 22 is provided according to FIG. 2, for example in the form of a control unit. The control device 22 is electrically connected to the air supply device 20 and to the electrolyte supply device 21, for example by way of suitable control lines 23. The control device 22 can be additionally electrically connected via suitable signal lines 24 to a sensor system of the battery 1 which is not shown in more detail here. Provided that the battery 1 is employed in a primary system, in particular in a vehicle, for providing electric energy, the control device 22 is additionally connected via such a control line 24 to a control of the system or of the vehicle which is not shown here, so that the control device 22 knows the current electric power requirement of the system, respectively of the vehicle. This current power requirement corresponds to a current power demand to the battery 1.

The control device 22 is now configured or programmed so that it activates the air supply device 20 and/or the electrolyte supply device 21 dependent on the current electric power demand to the battery 1 in such a manner that the air supply device 20 generates an air flow that is adapted to the current power demand and/or that the electrolyte supply device 21 generates an electrolyte flow that is adapted to the current power demand. Preferentially, the configuration or programming of the control device 22 takes place in such a manner that it initially, dependent on the current power demand, determines in a first step an electrolyte flow to suit said power demand, for example by way of characteristic curves or characteristic maps or by way of suitable calculation formula, and then activates the electrolyte supply device 21 so that the same generates the determined electrolyte flow. In a second step, which can take place quasi in parallel, the control device 22 can determine an air flow that is required for the determined electrolyte flow, likewise by way of characteristic curves or characteristic maps or by means of suitable calculation formulae, so that it can subsequently activate the air supply device 20 for generating the determined air flow.

The control device 22 thus makes possible a hydraulic or hydropneumatic open-loop or closed-loop power control of the battery 1. When the power demand increases, the volumetric flows for electrolyte and air are suitably increased. When by contrast the power demand decreases, the volumetric flows for electrolyte and air are suitably reduced. Accordingly, the wear of the battery 1, i.e. the dissolution of the anode 11, is minimised. Because of this, the battery 1 has a comparatively long life span.

In addition, the control device 22 can be programmed or configured so that it activates the electrolyte supply device 21 for example for switching off the battery 1 so that it drains the electrolyte chamber 10 or the entire electrolyte path 17 of electrolyte. This can be additionally followed by a flushing with a suitable neutral or inert flushing medium.

As is evident in particular from FIG. 1, the anode 11, according to a preferred embodiment, can be rotatably mounted on the housing 2 about its longitudinal centre axis 13. A corresponding rotary movement is indicated in the figures by a rotary arrow 25. Through the rotary movement of the anode 11, the contact between anode 11 and electrolyte is improved, which improves the electrolytic reaction for current generation. At the same time, the rotation of the anode 11 at suitable rotational speeds can generate centrifugal forces which can cause reaction products to be detached from the anode 11, which likewise improves the efficiency of the electrolyte reaction. The anode 11 or its anode body 12 is arranged on a metallic support plate 26 and mechanically and electrically connected to the same. In this regard, the support plate 26 can also be counted as part of the scope of the anode 11. The support plate 26 is rotatably mounted about the longitudinal centre axis 13 of the anode 11 via an axial bearing 27 on the housing 2. The axial bearing 27 to this end is arranged on a face end 28 of the housing shell 3 facing away from the bottom 4.

The battery 1 comprises two galvanic or electric power connections 29, 30, namely a first electrical power connection 29, which represents a negative terminal that is electrically connected to the anode 11, and a second electrical power connection 30, which represents a positive terminal that is electrically connected to the cathode 7.

In the preferred example shown here, the galvanic power connection 29 on the anode side is formed on the axial bearing 27 or connected to the same in a fixed manner, as a result of which it is fixed in location with respect to the housing 2 and in contrast with the non-stationary or rotating anode 11, arranged stationarily or rotationally fixed.

The axial bearing 27 can be configured as a rolling bearing in principle. However, preferred is the shown embodiment in which the axial bearing 27 is configured as sliding bearing. In particular, the axial bearing 27 to this end can comprise a anti-friction metal ring 31 and an annular bearing shell 32. The bearing shell 32 is arranged fixed on the housing 2. The anti-friction metal ring 31 is inserted in the bearing shell 32. To this end, the bearing shell 32 in the example comprises an axially open annular groove 33. The anti-friction metal ring 31 lies in the annular groove 33. The support plate 26 is supported on the anti-friction metal ring 31 and can slide thereon during the operation of the battery 1. The anti-friction metal ring 31 comprises an annular body 34, which consists of an anti-friction metal alloy, and at least one metallic heating conductor 35, which is arranged in the annular body 34. With the help of the heating conductor 35, the annular body 34 can be heated. A power supply of the heating conductor 35 which is not shown here can be configured so that the heating conductor 35 heats the annular body 34 to a predetermined operating temperature, which on the one hand lies below a melting point of the anti-friction metal alloy and which on the other hand however is so close to the melting point of the anti-friction metal alloy that surface melting occurs on the annular body 34. For example, the operating temperature is approximately 10% to 20% below the melting temperature of the anti-friction metal alloy. As anti-friction metal alloy, a low-melting alloy is practically used, which can have a maximum melting point of 250° C. to 350° C. By heating up the annular body 34 to the predetermined operating temperature, said surface melting on the annular body 34 occurs, so that a surface of the annular body 34 located outside is liquefied at least in the region of the support plate 26. On the one hand, this produces an extremely low-friction hydraulic sliding mounting. On the other hand, this significantly improves the electrical contact between anti-friction metal ring 31 and support plate 26, as a result of which large currents can be transmitted with low voltages.

The power supply of the heating conductor 35 mentioned above can be realised by a separate power supply which can be open-loop or closed-loop controlled with the help of the control device 22 for example in conjunction with a temperature sensor, in order to adjust the desired operating temperature on the annular body 34. In a simplified case, the power supply can also be realised with the help of at least one PTC element, which is connected in series with the heating conductor 35 in a suitable location. It is conceivable, in particular, to introduce the heating conductor 35 into a current path between the support plate 26 and the axial bearing 32, if required including the respective PTC element.

According to another advantageous embodiment, which is likewise shown here, the electrolyte path 17 is conducted past the anode 11 or the anode body 12 so that the electrolyte flow during the operation of the battery 1 rotatingly drives the rotatably mounted anode 11. To this end, the electrolyte inlet 18 can be arranged tangentially to the electrolyte chamber 10. Accordingly, the inflow of electrolyte into the electrolyte chamber 17 takes place near the cathode 7. Furthermore it can be provided that the electrolyte inlet 18 is arranged on a first end region of the electrolyte chamber 10, here distally to the bottom 4 or in the installation state at the top, while the electrolyte outlet 19 is arranged on a second end region of the electrolyte chamber 10, which is distant from the first end region. In the example of FIG. 1 or in the installation state, the electrolyte outlet 19 is arranged proximally to the bottom 4, i.e. at the bottom. In the shown example, the electrolyte outlet 19 is additionally orientated axially and passed through the bottom 4. The arrangement of electrolyte inlet 18 and electrolyte outlet 19 at opposite axial ends of the electrolyte chamber 10 brings about an axial through-flow of the electrolyte chamber 10 with electrolyte. The tangential arrangement of the electrolyte inlet 18 generates in the electrolyte chamber 10 a swirling flow or helical flow, which even because of frictional effects rotatingly drives the anode 11. The swirling flow in the electrolyte chamber 10 however also makes possible comparatively high flow velocities with a comparatively large dwell duration for the electrolyte in the electrolyte chamber 10.

In the example, the anode 11 or the anode body 12 is equipped, on an outside 36 exposed to the electrolyte chamber 10, with flow guiding structures 37. Here, the flow guiding structures 37 are configured so that they can transmit a torque to the anode 11 when the anode 11 is impinged by the electrolyte flow. The flow guiding structures 37 can thus utilise kinetic energy of the electrolyte flow for driving the anode 11. The flow guiding structures 37 can be formed for example by helical blades or blade sections. The flow guiding structures 37 are provided cumulatively to the tangential electrolyte inlet 18 here, but can also be provided alternatively thereto.

While with the example described above the electrolyte flow, which is generated in a suitable manner, is utilised for rotatingly driving the anode 11, it can be provided, according to another embodiment, to use the rotation of the anode 11 for driving the electrolyte, i.e. for generating the electrolyte flow. To this end, a rotary drive 26 which is indicated with interrupted line in FIG. 2 can be provided, which rotatingly drives the anode 11. In the example, the rotary drive 56, which can for example be an electric motor, drives the support plate 26, which supports the anode body 12. In this case, the flow guiding structures 37 operate like moving blades of an axial flow machine for example as with a propeller. The driven anode 11 in this case forms an electrolyte delivery device. The control device 22 can be electrically connected to the rotary drive 56 via a suitable control line 23, in order to be able to activate the rotary drive 56 depending on demand.

According to FIG. 2, the air supply device 20 can comprise a concentration device 38 upstream of the air inlet 15, with the help of which the oxygen proportion in the air flow can be increased. The concentration device 38 can operate by means of suitable filter structures, in particular membranes and the like. Accordingly, the air flow downstream of the concentration device 38 has a significantly elevated oxygen proportion compared with the air flow upstream of the concentration device 38. By way of a waste air line 39, an air flow with suitably reduced oxygen proportion or elevated nitrogen proportion can be discharged from the concentration device 38. The air supply device 20 in this case additionally comprises a blower 40 for driving or generating the air flow. The blower 40 can be activated by the control device 22. In addition, a "normal" air filter which is not shown here can be included in the air supply device 20, with which liquid and/or solid contaminations can be filtered out of the air.

The electrolyte supply device 21 according to FIG. 2 is equipped with a closed electrolyte circuit 41, which comprises an advance 42 and a return 43. The advance 42 fluidically connects an electrolyte tank 44 for storage of the electrolyte through the electrolyte inlet 18. In the advance 42, an advance pump 45 is arranged, which can be activated with the help of the control device 22. The return 43 fluidically connects the electrolyte outlet 19 to the electrolyte tank 44 and contains a return pump 46, which can be activated with the help of the control device 22. Advance pump 45 and return pump 46 in this case form electrolyte delivery devices.

In the return 43, an electrolyte cleaning device 47 is additionally arranged downstream of the return pump 46, with the help of which reaction products can be removed from the electrolyte. Thus, conditioning of the electrolyte takes place within the electrolyte cleaning device 47 so that cleaned or unconsumed electrolyte can be fed to the electrolyte tank 44. The electrolyte cleaning device 47 can be configured for example as a centrifuge, in particular with a membrane. Here, the centrifuge can be configured as a return jet centrifuge, which is driven by the kinetic energy of the electrolyte flow.

In the return 43, a gas separation device 48 can be additionally arranged, with the help of which gases can be separated from the liquid electrolyte. In the example, the gas separation device 48 is arranged downstream of the return pump 46 or downstream of the electrolyte cleaning device 47. The separated gas is in particular hydrogen gas, which is generated during the electrolyte reaction in the electrolyte chamber 10. The gas separation device 48 can comprise a plurality of nozzles for the improved gas separation, through which the liquid electrolyte is pressed. It has been shown that the nozzles amplify a bubble formation which simplifies the separation of the gas from the liquid electrolyte.

The gas separation device 48 is fluidically connected via a gas line 49, to a conversion device 50 with the help of which the chemical energy of the separated gas can be converted into electric and/or thermal energy. The conversion device 50 for example is a catalytic burner so that the combustible gases can be exothermically converted in order to generate heat. Alternatively, the conversion device 50 can be a hydrogen-air fuel cell, which converts the separated hydrogen gas into heat and electric energy with the help of air oxygen. The energy converted with the help of the conversion device 50 from the separated gases can be fed, according to an arrow 51, to the battery 1 or the respective primary system, i.e. in particular the vehicle.

Furthermore, a heat exchanger 55 can be arranged in the return 43, with the help of which the returned electrolyte can be cooled. The heat discharged in the process can either be fed to the reaction zone within the electrolyte chamber 10 or the primary system of the battery 1, in particular the vehicle. In the example of FIG. 2, the heat exchanger 55 is integrated in the gas separation device 48.

According to FIG. 1, it can be provided to arrange at least the air inlet 15 tangentially to the air chamber 9 for increasing a dwell duration of the air flow in the air chamber 9. Furthermore, air inlet 15 and air outlet 16 are arranged at ends of the air chamber 9 that are distant from one another. Here, an arrangement that is inverted compared with the electrolyte path 17 is preferred so that for the electrolyte path 17 and the air path 14 the so-called counter-flow principle can be realised. Accordingly, the air inlet 15 in the example is arranged proximally to the bottom 4 while the air outlet 16 is arranged distally to the bottom 4.

For heating the anode 11 or the anode body 12, an induction heating 57 can be provided, which is arranged for example in the region of the cathode 7. With the help of the induction heating 52, the anode 11 or the anode body 12 can be contactlessly heated while on the other hand, heating specifically takes place in the region of the outside 36 facing the electrolyte chamber 10, which is also exposed to the electrolyte flow. Thus, heating takes place specifically where an increased temperature for improved electrolyte reaction is desirable. The induction heating 52 is configured in particular so that a standing electromagnetic field with magnetic polarisation alternating in the circumferential direction is generated, which takes place by induction only upon a relative movement of the anode 11 for the desired surface heating of the anode 11 or of the anode body 12. The relative movement of the anode 11 in this case is effected through the rotation of the anode 11 about its longitudinal centre axis 13. The inductive heating is rotational speed controlled, the rotational speed of the anode 11 depending on the volumetric flow of the electrolyte.

Although in the preferred example shown here only a single cathode 7 and only a single anode 11 are arranged in the housing 2, it can be provided in another embodiment to arrange a plurality of cathodes 7 and a plurality of anodes 11 in the same housing 2. It is likewise conceivable to arrange a plurality of anodes 11 in the same cathode 7.

A battery system which is globally designated 57 in FIG. 2 comprises at least two metal-air batteries 1 of the type described above, wherein however the peripheral units or components can be jointly utilised. For example, a plurality of batteries 1 can be supplied with the respective air flow by a common air supply device 20. Furthermore, a plurality of batteries 1 can be supplied with the respective electrolyte flow by a common electrolyte supply device 21. In particular, a common control device 22 can be used in order to operate a plurality of batteries 1 or the battery system 57. In particular, common delivery devices for generating the air flows or electrolyte flows for the individual batteries 1 can also be used. The batteries 1 can be connected electrically in series or in parallel. Independently of this, the electrolyte paths 17 of the batteries 1 can be arranged fluidically in parallel or in series. For example, a common electrolyte circuit 41 can be provided, into which a plurality of batteries 1 is fluidically incorporated, so that further components of the electrolyte circuit 41 can be jointly utilised, such as for example the electrolyte cleaning device 47 and/or the gas separation device 48. Likewise, the air paths 14 of the batteries 1 can be arranged fluidically in parallel or in series, wherein further components of the air supply device 20 can also be jointly utilised here, such as for example the concentration device 38 or an air filter.

A vehicle, which has an electromotoric drive, can be equipped with at least one battery of the type described above or with a battery system 57 described above, in order to provide electric energy for the respective electric motor. It is particularly advantageous that the battery 1 introduced here can be electrically connected, because of their hydraulic or hydropneumatic open-loop or closed-loop power control, unbuffered in principle, to the respective current consumer of the vehicle or to a corresponding power electronic system so that in particular heavy accumulators and the like can be omitted.

For operating such a metal-air battery 1 or such a battery system 57 it can be now be provided that dependent on a current power demand on the metal-air battery 1 or on the battery system 57 an electrolyte flow suitable for this purpose and/or an air flow suitable for this purpose is/are generated for the respective battery 1. Practically it can be provided to this end that for adapting the electrolyte flow the respective electrolyte delivery device, i.e. preferentially the electrolyte pumps 47, 46 for the rotatingly driven anode 11, is suitably activated for increasing or reducing their delivery output and/or that for adapting the air flow the respective air delivery device, i.e. preferentially the blower 40, is suitably activated for increasing or reducing its delivery output.

According to FIG. 1 and according to a particularly advantageous embodiment the anode 11 can be produced so that its anode body 12 comprises a matrix 53 of sodium, into which the particles 54 of an aluminium alloy are embedded. Consequently, this is not an aluminium-sodium alloy but an aluminium-sodium composite material. This is achieved in that a granulate of the aluminium alloy, which forms the particles 54, is introduced into a melt of sodium, which in the process forms the matrix 53. With the help of this sodium melt, which contains the particles 54 of the aluminium alloy, the anode 11 or the anode body 12 can be cast.

The particles 54 can for example have a particle size of 10 μm to 100 μm. Preferred is a particle size of 40 μm to 60 μm. Particularly preferred is a particle size of approximately 50 μm. The proportion of the particles 54 in the anode body 12 is preferentially in a range from 40% to 80%. Advantageous is a particle proportion of 60% to 70%. Particularly preferable is a particle proportion of approximately 65%, expressed as percent by weight.

The aluminium from which the particles 54 are produced, can contain zirconium according to an advantageous embodiment. It has been shown that zirconium in the aluminium alloy reduces the formation of a barrier layer on the outside 36 of the anode body 12 just so far that a direct conversion of aluminium with water into aluminium oxide and hydrogen is largely prevented. Preferably, the aluminium alloy contains 0.01% to 1.00% zirconium. Preferred is a zirconium proportion of 0.05% to 0.8%. Particularly advantageous is a zirconium proportion of approximately 0.5%. The above percentage information is expressed as percent by weight. The aluminium alloy otherwise consists exclusively of aluminium except for unavoidable contaminations due to the production.

The electrolyte preferably employed here consists of an aqueous acid or an aqueous alkaline solution, to which is added at least one halogen and at least one tenside. Halogens are fluorine, chlorine, bromium, iodine, astate and ununseptium. Possible for the electrolyte are especially fluorine, chlorine, bromium and iodine. Preferred in this case is fluorine. Here, the halogens are not employed in the pure form but in the form of fluoro compounds, in particular in the form of salts containing fluorine, so-called fluorides. Tensides are substances which lower the surface tension of a liquid or the interfacial tension between two phases and make possible or promote the formation of dispersions or acts as solubilizer.

The acid or alkaline solution used for the electrolyte has a concentration in water of 10% to 40%. Preferred here is a concentration in the range from 15% to 25%. Particularly advantageous is a concentration of approximately 20%. Within the acid or alkaline solution, the halogen has a proportion of 0.1% to 4.0%. Preferred is a halogen proportion of 0.5% to 2.0%. A preferred halogen in this case is potassium aluminium pentafluoride. The tenside in the acid or alkaline solution has a proportion of 0.1% to 2.0%. Preferred is a tenside proportion of 0.2% to 1.0%. Sodium Lauryl Sulfate is preferred as tenside. The above percentage information is expressed as percent by weight in each case.

The invention claimed is:

1. A metal-air battery comprising:
   a housing;
   at least one hollow-cylindrical cathode arranged in the housing between an air chamber and an electrolyte chamber;
   at least one metallic anode arranged in the electrolyte chamber;
   an air path leading through the housing from an air inlet of the housing, which is fluidically connected to the air chamber, to an air outlet of the housing, which is fluidically connected to the air chamber;
   an air supply device for generating an air flow following the air path impinging on the at least one hollow-cylindrical cathode;
   an electrolyte path leading through the housing from an electrolyte inlet of the housing, which is fluidically connected to the electrolyte chamber, to an electrolyte outlet of the housing, which is fluidically connected to the electrolyte chamber; and
   an electrolyte supply device for generating an electrolyte flow following the electrolyte path impinging on the at least one metallic anode and the at least one hollow-cylindrical cathode.

2. The battery according to claim 1, further comprising a control device for operating the metal-air battery, the control device being electrically connected to the air supply device and to the electrolyte supply device, wherein the control device is at least one of configured and programmed so that, as a function of a current electric power demand on the metal-air battery, the control device activates at least one of the air supply device for generating an air flow adapted to the power demand and the electrolyte supply device for generating an electrolyte flow adapted to the power demand.

3. The battery according to claim 2, wherein the control device is at least one of configured and programmed so that, as a function of the current electric power demand, the control device activates the electrolyte supply device for generating the electrolyte flow adapted to the current electric power demand, and activates the air supply device for generating an air flow adapted to the adapted electrolyte flow.

4. The battery according to claim 2, the control device is at least one of configured and programmed so that, for switching off the metal-air battery, the control device activates the electrolyte supply device for draining the electrolyte path of electrolyte.

5. The battery according to claim 1, wherein the at least one metallic anode is rotatably mounted on the housing about a longitudinal center axis of the at least one metallic anode.

6. The battery according to claim 5, further comprising a rotary drive for rotationally driving the at least one metallic anode.

7. The battery according to claim 6, characterized in that the at least one metallic anode is configured so that a rotation of the at least one metallic anode drives the electrolyte in the electrolyte path.

8. The battery according to claim 7, wherein the at least one metallic anode on its outside exposed to the electrolyte chamber comprises flow guiding structures that, with the rotation of the at least one metallic anode, drive the electrolyte.

9. The battery according to claim 5, wherein the electrolyte path is conducted past the at least one metallic anode so that the electrolyte flow rotatingly drives the at least one metallic anode.

10. The battery according to claim 9, wherein the electrolyte inlet on a first end region of the electrolyte chamber is arranged tangentially to the electrolyte chamber, and the electrolyte outlet is arranged on a second end region of the electrolyte chamber.

11. The battery according to claim 9, wherein the at least one metallic anode on its outside exposed to the electrolyte chamber comprises flow guiding structures which transmit a torque to the at least one metallic anode when the at least one metallic anode is impinged by the electrolyte flow.

12. The battery according to claim 1, wherein the at least one metallic anode is configured cylindrically and is mechanically and electrically connected to a metallic support plate.

13. The battery according to claim 12, wherein the support plate via an axial bearing is rotatably mounted on the housing about a longitudinal center axis of the at least one metallic anode.

14. The battery according to claim 13, further comprising a power connection formed on the axial bearing on an anode side.

15. The battery according to claim 13, wherein the axial bearing comprises an anti-friction metal ring which lies in an annular bearing shell on a housing side and on which the support plate is supported and slides with the at least one metallic anode rotating.

16. The battery according to claim 15, wherein the anti-friction metal ring comprises an annular body of an anti-friction metal alloy and at least one heating conductor arranged in the annular body and configured to heat the annular body.

17. The battery according to claim 16, wherein a power supply of the heating conductor is configured so that the heating conductor heats the annular body to a predetermined operating temperature which is below a melting point of the anti-friction metal alloy but allows a surface melting to occur on the annular body.

18. The battery according to claim 1, wherein the air supply device upstream of the air inlet comprises a concentration device which increases an oxygen proportion in the air flow.

19. The battery according to claim 1, wherein the electrolyte supply device comprises an electrolyte circuit which includes an advance leading from an electrolyte tank to the electrolyte inlet, and a return leading from the electrolyte outlet to the electrolyte tank.

20. The battery according to claim 19, further comprising an advance pump for driving the electrolyte arranged in the advance.

21. The battery according to claim 19, further comprising a return pump for driving the electrolyte arranged in the return.

22. The battery according to claim 19, further comprising an electrolyte cleaning device for removing reaction products from the electrolyte arranged in the return.

23. The battery according to claim 19, further comprising a gas separation device for removing gases from the liquid electrolyte arranged in the return.

24. The battery according to claim 23, wherein the gas separation device by way of a gas line is fluidically connected to a conversion device for converting the chemical energy of the separated gas into at least one of electric and thermal energy.

25. The battery according to claim 24, wherein the conversion device is a catalytic burner.

26. The battery according to claim 24, wherein the conversion device is a hydrogen-air fuel cell.

27. The battery according to claim 1, wherein at least one of:
the air inlet is arranged tangentially to the air chamber; and
the air outlet is arranged tangentially to the air chamber.

28. The battery according to claim 1, further comprising an induction heating for heating the at least one metallic anode.

29. The battery according to claim 28, wherein the induction heating is arranged in a region of the at least one hollow-cylindrical cathode.

30. A battery system comprising:
a plurality of metal-air batteries each having:
a housing;
at least one hollow-cylindrical cathode arranged in the housing between an air chamber and an electrolyte chamber;
at least one metallic anode arranged in the electrolyte chamber;
an air path leading through the housing from an air inlet of the housing, which is fluidically connected to the air chamber, to an air outlet of the housing, which is fluidically connected to the air chamber; and
an electrolyte path leading through the housing from an electrolyte inlet of the housing, which is fluidically connected to the electrolyte chamber, to an electrolyte outlet of the housing, which is fluidically connected to the electrolyte chamber; and
at least one of:
a common air supply device for generating respective air flows through the air paths of the metal-air batteries;
a common electrolyte supply device for generating respective electrolyte flows through the electrolyte paths of the metal-air batteries; and
a common control device for operating the batteries.

31. A vehicle comprising:
an electromotoric drive having a power supply, and one of:
at least one metal-air battery having:
a housing;
at least one hollow-cylindrical cathode arranged in the housing between an air chamber and an electrolyte chamber;
at least one metallic anode arranged in the electrolyte chamber;
an air path leading through the housing from an air inlet of the housing, which is fluidically connected to the air chamber, to an air outlet of the housing, which is fluidically connected to the air chamber;
an air supply device for generating an air flow following the air path impinging on the at least one hollow-cylindrical cathode;
an electrolyte path leading through the housing from an electrolyte inlet of the housing, which is fluidically connected to the electrolyte chamber, to an electrolyte outlet of the housing, which is fluidically connected to the electrolyte chamber; and
an electrolyte supply device for generating an electrolyte flow following the electrolyte path impinging on the at least one metallic anode and the at least one hollow-cylindrical cathode; or
a battery system including:
a plurality of metal-air batteries each having:
a housing;
at least one hollow-cylindrical cathode arranged in the housing between an air chamber and an electrolyte chamber;
at least one metallic anode arranged in the electrolyte chamber;
an air path leading through the housing from an air inlet of the housing, which is fluidically connected to the air chamber, to an air outlet of the housing, which is fluidically connected to the air chamber;
an electrolyte path leading through the housing from an electrolyte inlet of the housing, which is fluidically connected to the electrolyte chamber, to an electrolyte outlet of the housing, which is fluidically connected to the electrolyte chamber; and
at least one of:
a common air supply device for generating respective air flows through the air paths of the metal-air batteries;
a common electrolyte supply device for generating respective electrolyte flows through the electrolyte paths of the metal-air batteries; and
a common control device for operating the batteries;
wherein a power electronic system for the power supply of the electromotoric drive is coupled in an unbuffered manner to the one of the at least one metal-air battery or the battery system.

32. A method for operating a metal-air battery, comprising:
  generating at least one of an electrolyte flow and an air flow dependent on a current power demand on the metal-air battery;
  wherein the metal-air battery includes:
    a housing;
    at least one hollow-cylindrical cathode arranged in the housing between an air chamber and an electrolyte chamber;
    at least one metallic anode arranged in the electrolyte chamber;
    an air path leading through the housing from an air inlet of the housing, which is fluidically connected to the air chamber, to an air outlet of the housing, which is fluidically connected to the air chamber;
    an air supply device for generating an air flow following the air path impinging on the at least one hollow-cylindrical cathode;
    an electrolyte path leading through the housing from an electrolyte inlet of the housing, which is fluidically connected to the electrolyte chamber, to an electrolyte outlet of the housing, which is fluidically connected to the electrolyte chamber; and
    an electrolyte supply device for generating an electrolyte flow following the electrolyte path impinging on the at least one metallic anode and the at least one hollow-cylindrical cathode.

33. The method according to claim 32, further comprising at least one of:
  activating at least one electrolyte delivery device for increasing or reducing its delivery output for adapting the electrolyte flow; and
  activating at least one air delivery device for increasing or for reducing its delivery output for adapting the air flow.

* * * * *